(No Model.)
A. ANSLEY.
POTATO DIGGER.
No. 246,279. Patented Aug. 30, 1881.
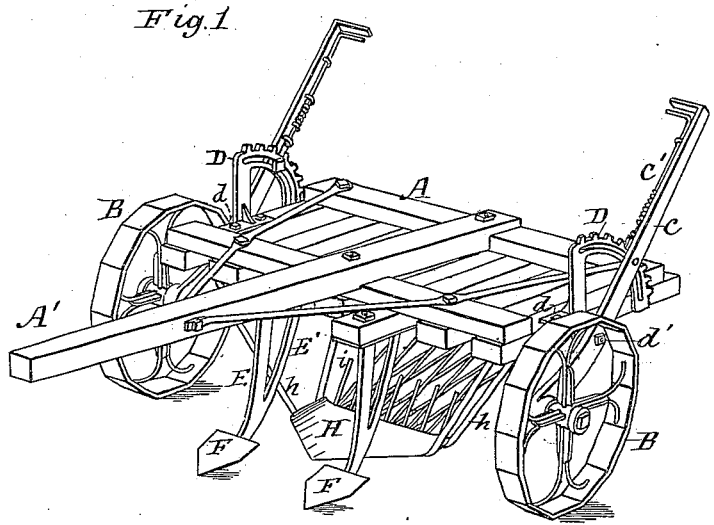
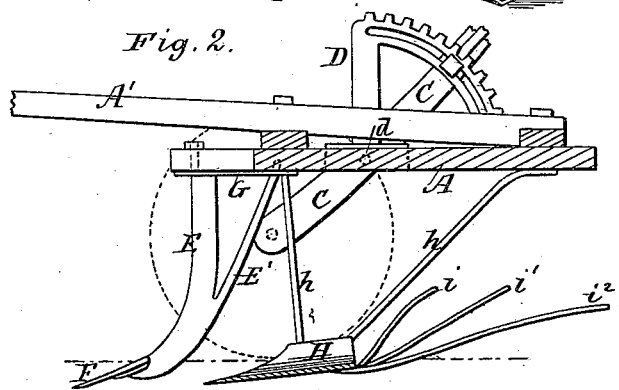
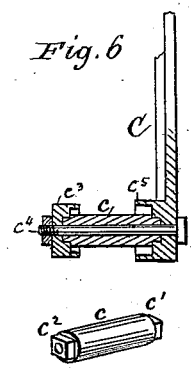
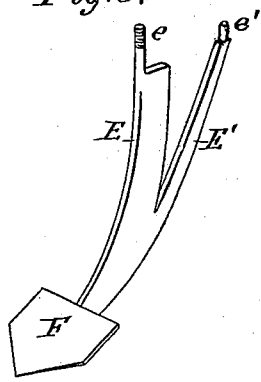
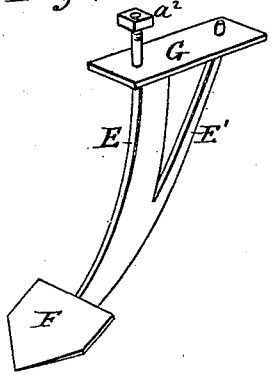
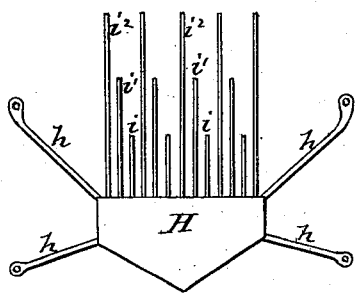
Witnesses:
W. B. Masson
W. E. Bowen
Inventor
Alanson Ansley
by E. E. Masson
atty.

UNITED STATES PATENT OFFICE.

ALANSON ANSLEY, OF GENEVA, NEW YORK.

POTATO-DIGGER.

SPECIFICATION forming part of Letters Patent No. 246,279, dated August 30, 1881.

Application filed December 6, 1880. (No model.)

*To all whom it may concern:*

Be it known that I, ALANSON ANSLEY, of Geneva, in the county of Ontario and State of New York, have invented certain new and useful Improvements in Combined Cultivator and Potato-Digger, of which the following is a specification.

My invention relates to improvements in machines that can be used to simply cultivate the soil by stirring the top of the ground and destroying weeds growing therein, or as a potato-digger; and the objects of my improvement are to provide said machine with independent wheels secured on the ends of adjustable levers retained by spring-latches engaging with the teeth of sectors, and with hoes having their standards of wrought-iron and their blade of sheet metal secured thereto in a nearly horizontal position, or at right angles to said standard, in combination with a central hoe or digger provided with four braces independently secured to said digger and diverging outwardly toward the bottom of the frame, said digger having secured to the rear thereof three rows of rods, each row of different length from the other and set at different angles.

In the accompanying drawings, Figure 1 represents a perspective view of the combined cultivator and potato-digger. Fig. 2 represents a longitudinal vertical section of the same. Fig. 3 is a perspective view of one of the cultivator-hoes. Fig. 4 is a perspective view of the same with its independent cap-plate in position. Fig. 5 is a top view of the central shovel and its accessories. Fig. 6 are detail views of one of the wheel-axles.

In the drawings, A represents the frame, and A' the tongue, of the implement. This frame is supported at any desired height above the ground upon wheels B, each one secured so as to revolve freely upon the short axle $c$, projecting outwardly from the lower end of a lever, C, pivoted at $d'$ to a casting, $d$, attached to the frame. This piece $d$ forms a portion of a sector, D, provided with teeth or notches to receive the lower end of a spring-latch, C', by means of which the inclination of the lever C can be regulated, and consequently the height of the frame above the ground. The rim of the wheels is made preferably polygonal to give to the hoes a slight up-and-down motion, and thus reduce the friction thereon.

To the under side of the frame are secured two or more flat-blade hoes, as hereinafter described. These hoes are composed of a standard made of wrought-iron or plate metal, having its upper portion forked. The front branch, E, is much wider than the rear branch, E'; but its upper end is cut away to form a projection, $e$, in the form of a bolt, and upon it a screwthread is cut to receive a nut when said standard is fastened to the frame. The rear branch is also formed with a shoulder, from which projects a pin, $e'$, to steady the standard when placed in position. To the lower end of said standard, and upon its forward edge, is attached a plate-metal polygonal blade, F, set at an acute angle to the horizon. To prevent the branches of the standard from cutting into the wood of the frame, and to give them a broad bearing and connecting-link, the independent cap G, provided with two or more perforations at suitable distance apart, is placed over the upper ends, $e$ and $e'$, so that it will rest upon the shoulders formed thereunder. The projection $e$ is of such a length as to go through the bars forming the frame A, above which a nut, $a^2$, is placed to secure the standard to said frame. The end or pin $e'$ of the rear branch enters into the under side of the frame only sufficiently to retain the hoe against lateral displacement when meeting a stone or any similar obstruction.

The standard, consisting of wrought-iron, is light and strong. Its cap G is also of simple and easy construction, and as the two do not require any welding they can be made at less cost than cast-iron standards.

The blade of the central hoe or digger, H, is much larger than the others, although relatively of nearly the same form. It is secured to the frame at an acute angle to the horizon by four divergent braces, $h$, and bolts passing through the upper end of said braces. As this large hoe H is used mainly to dig potatoes and bring them up on top of the soil, it is provided with three rows of wires or light rods, $i$ $i'$ $i^2$, different in length, rigidly secured to the rear thereof. The row of shortest rods, $i$, stands at an angle of about forty-five degrees to the blade, the row $i'$ at an angle of about thirty degrees, and the row of longest rods, $i^2$, at an angle of about fifteen degrees, forming inclined elevators, over which potatoes can be elevated, and from the ends of which they fall in three successive cascades before reaching the top of the ground, thus freeing them from the soil. The front hoes, F, loosen the ground on each side of the plants and facilitate the operation of the digger H, destroying at the same time the weeds in their path.

Each wheel-axle $c$ is hollow and has polygonal ends $c'$ $c^2$. The end $c'$ fits into a corresponding recess in the end of the lever, and the cap $c^3$ fits over the end $c^2$. The hub of each wheel is placed upon the short axle, and is retained by the cap $c^3$ and the central bolt, $c^4$. The rim of the cap $c^3$ and the rim $c^5$ at the end of the lever serve to keep sand off the bearing.

The machine is represented as having only two small hoes; but if the large hoe H is unbolted and removed a larger number of them may be used.

Having now fully described my invention, I claim—

The combination of the frame A, adjustable levers C, and wheels at the lower end thereof, with the digger H, secured by four divergent braces to the frame, opening-plows E F, and series of rods $i$ $i'$ $i^2$, different in length, and each set forming with the body of said digger different angles, substantially as and for the purpose described.

ALANSON ANSLEY.

Witnesses:
M. S. SANDFORD,
G. S. PRINCE.